(12) United States Patent
Kang et al.

(10) Patent No.: US 12,532,226 B2
(45) Date of Patent: Jan. 20, 2026

(54) COMMUNICATION APPARATUSES AND COMMUNICATION METHODS FOR UTILIZATION OF RESERVED RESOURCE

(71) Applicant: Panasonic Intellectual Property Corporation of America, Torrance, CA (US)

(72) Inventors: Yang Kang, Singapore (SG); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 432 days.

(21) Appl. No.: 17/796,605

(22) PCT Filed: Nov. 19, 2020

(86) PCT No.: PCT/SG2020/050672
§ 371 (c)(1),
(2) Date: Jul. 29, 2022

(87) PCT Pub. No.: WO2021/167527
PCT Pub. Date: Aug. 26, 2021

(65) Prior Publication Data
US 2023/0057436 A1    Feb. 23, 2023

(30) Foreign Application Priority Data

Feb. 21, 2020  (SG) ............... 10202001575X

(51) Int. Cl.
*H04W 28/26*   (2009.01)
*H04L 1/16*    (2023.01)
*H04W 72/20*   (2023.01)
(52) U.S. Cl.
CPC ............ *H04W 28/26* (2013.01); *H04L 1/16* (2013.01); *H04W 72/20* (2023.01)

(58) Field of Classification Search
CPC .......... H04W 72/0446; H04W 72/044; H04W 72/04; H04W 72/00; H04W 72/20; H04W 72/21; H04W 72/23
See application file for complete search history.

(56) References Cited

U.S. PATENT DOCUMENTS 10,869,318 B2 * 12/2020 Feng .................. H04W 4/44
2007/0054667 A1   3/2007 Lee et al.
(Continued)

FOREIGN PATENT DOCUMENTS

CN         110545534 A      12/2019

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).
(Continued)

*Primary Examiner* — Diana J. Cheng
(74) *Attorney, Agent, or Firm* — Seed Intellectual Property Law Group LLP

(57) ABSTRACT

The present disclosure provides communication apparatuses and communication methods for utilization of released resource. The communication apparatuses include a communication apparatus comprising: a receiver which, in operation, receives release information relating to a reserved resource from another communication apparatus, the reserved resource being reserved for a transmission from the another communication apparatus; and circuitry which, in operation, selects a resource from a plurality of resource candidates when the communication apparatus is to do a subsequent transmission, wherein the plurality of resource candidates includes the reserved resource.

10 Claims, 17 Drawing Sheets

(56) References Cited

U.S. PATENT DOCUMENTS

2018/0035427 A1 2/2018 Gupta et al.
2020/0037343 A1 1/2020 He et al.
2020/0314804 A1 10/2020 Shin et al.

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; NR and NG-RAN Overall Description; Stage 2 (Release 15)," 3GPP TS 38.300 V15.7.0, Sep. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; Evolved Universal Terrestrial Radio Access (E-UTRA); Physical layer procedures (Release 16)," 3GPP TS 36.213 V16.0.0, Dec. 2019 (568 pages).

3GPP, "3rd Generation Partnership Project; Technical Specification Group Services and System Aspects; Architecture enhancements for 5G System (5GS) to support Vehicle-to-Everything (V2X) services (Release 16)," 3GPP TS 23.287 V16.0.0, Sep. 2019 (49 pages).

Fujitsu, "Discussion on Reservation and Sensing based Resource Selection Methods for NR-V2X Sidelink Communication," R1-1906439, Agenda item: 7.2.4.2.3, 3GPP TSG RAN WG1 #97, Reno, USA, May 13-17, 2019. (7 pages).

Interdigital, Inc., "NR Sidelink Resource Allocation Mechanism for Mode 2," R1-1907094, Agenda Item: 7.2.4.2.2, 3GPP TSG RAN WG1 #97, Reno, USA, May 13-17, 2019. (4 pages).

International Search Report, mailed Mar. 1, 2021, for International Patent Application No. PCT/SG2020/050672 (4 pages).

Lenovo, Motorola Mobility, "Discussion on resource allocation for NR sidelink Mode 2," R1-1906269, Agenda Item: 7.2.4.2.2, 3GPP TSG RAN WG1 #97, Reno, USA, May 13-17, 2019. (6 pages).

Nokia, Nokia Shanghai Bell, "Discussion of Resource Allocation for Sidelink—Mode 2," R1-1906076, Agenda item: 7.2.4.2.2, 3GPP TSG RAN WG1 Meeting #97, Reno, USA, May 13-17, 2019. (7 pages).

Office Action, dated Jul. 1, 2025, for Indian Patent Application No. 202247042282. (5 pages)(with English Translation).

* cited by examiner

COMMUNICATION APPARATUSES AND COMMUNICATION METHODS FOR UTILIZATION OF RESERVED RESOURCE

TECHNICAL FIELD

The following disclosure relates to communication apparatuses and communication methods for New Radio (NR) communications, and more particularly to communication apparatuses and communication methods for utilization of reserved resource, especially a resource that is reserved but not used.

BACKGROUND

V2X communication allows vehicles to interact with public roads and other road users, and is thus considered a critical factor in making autonomous vehicles a reality.

To accelerate this process, 5G NR based V2X communications (interchangeably referred to as NR V2X communications) is being discussed by the 3rd Generation Partnership Project (3GPP) to identify technical solutions for advanced V2X services, through which vehicles (i.e. interchangeably referred to as communication apparatuses or user equipment (UEs) that support V2X applications) can exchange their own status information through sidelink (SL) with other nearby vehicles, infrastructure nodes and/or pedestrians. The status information includes information on position, speed, heading, etc.

In such V2X communications, there are at least two SL resource allocation modes being discussed by the 3GPP. In resource allocation Mode 1, SL resource(s) to be used by a UE for SL transmissions are scheduled by a base station (BS). In resource allocation Mode 2, the UE determines, i.e. the BS does not schedule, SL transmission resources within the SL resources configured by the BS/network or pre-configured SL resources. The 3GPP study on resource allocation also considers sensing and resource selection procedures for a Mode 2(a), in the context of a semi-persistent scheme where resource(s) are selected for multiple transmissions of different transmission blocks (TBs) and a dynamic scheme where resource(s) are selected for each TB transmission.

In the 3GPP RAN WG1 #96b meeting in Xi'an, the following items were considered:
1. NR V2X supports an initial transmission of a TB without reservation, based on sensing and resource selection procedure.
2. NR V2X supports reservation of a sidelink resource for an initial transmission of a TB at least by a sidelink control information (SCI) associated with a different TB, based on sensing and resource selection procedure. This functionality can be enabled/disabled by (pre-) configuration.
3. For further study (FFS): Standalone Physical Sidelink Control Channel (PSCCH) transmissions for resource reservations are supported in NR V2X.

In the 3GPP RAN WG1 #97 meeting in Reno, the following items were considered:
4. NR V2X Mode-2 supports resource reservation for feedback-based Physical Sidelink Shared Channel (PSSCH) retransmissions by signaling associated with a prior transmission of a same TB.
   1. FFS: impact on subsequent sensing and resource selection procedures.
   2. At least from the transmitter perspective of above-mentioned TB, usage of Hybrid Automatic Repeat Request (HARQ) feedback for release of unused resource(s) is supported.

However, there has been no discussion on communication apparatuses and methods for utilization of a reserved resource that is not used in an initial transmission.

There is thus a need for communication apparatuses and methods that provide feasible technical solutions for utilization of reserved resource. Furthermore, other desirable features and characteristics will become apparent from the subsequent detailed description and the appended claims, taken in conjunction with the accompanying drawings and this background of the disclosure.

SUMMARY

Non-limiting and exemplary embodiment facilitates providing communication apparatuses and methods for utilization of reserved resource that is not used.

According to a first embodiment of the present disclosure, there is provided a communication apparatus comprising: a transmitter, which, in operation, transmits to a receiving communication apparatus data in a first reserved resource among at least two reserved resources, each of the at least two reserved resources being reserved for a transmission to the receiving communication apparatus; a receiver, which, in operation, receives response information indicating if the transmission of data in the first reserved resource is successfully received by the receiving communication apparatus; and circuitry, which, in operation, determines a usage of the second reserved resource among the at least two reserved resources based on the response information.

According to a second embodiment of the present disclosure, there is provided a communication method comprising: transmitting, to a receiving communication apparatus, data in a first reserved resource among at least two reserved resources, each of the at least two reserved resources being reserved for a transmission to the receiving communication apparatus; receiving, at a communication apparatus, response information indicating if the data in the first reserved resource is successfully received by the receiving communication apparatus; and determining a usage of the second reserved resource among the at least two reserved resources based on the response information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1:
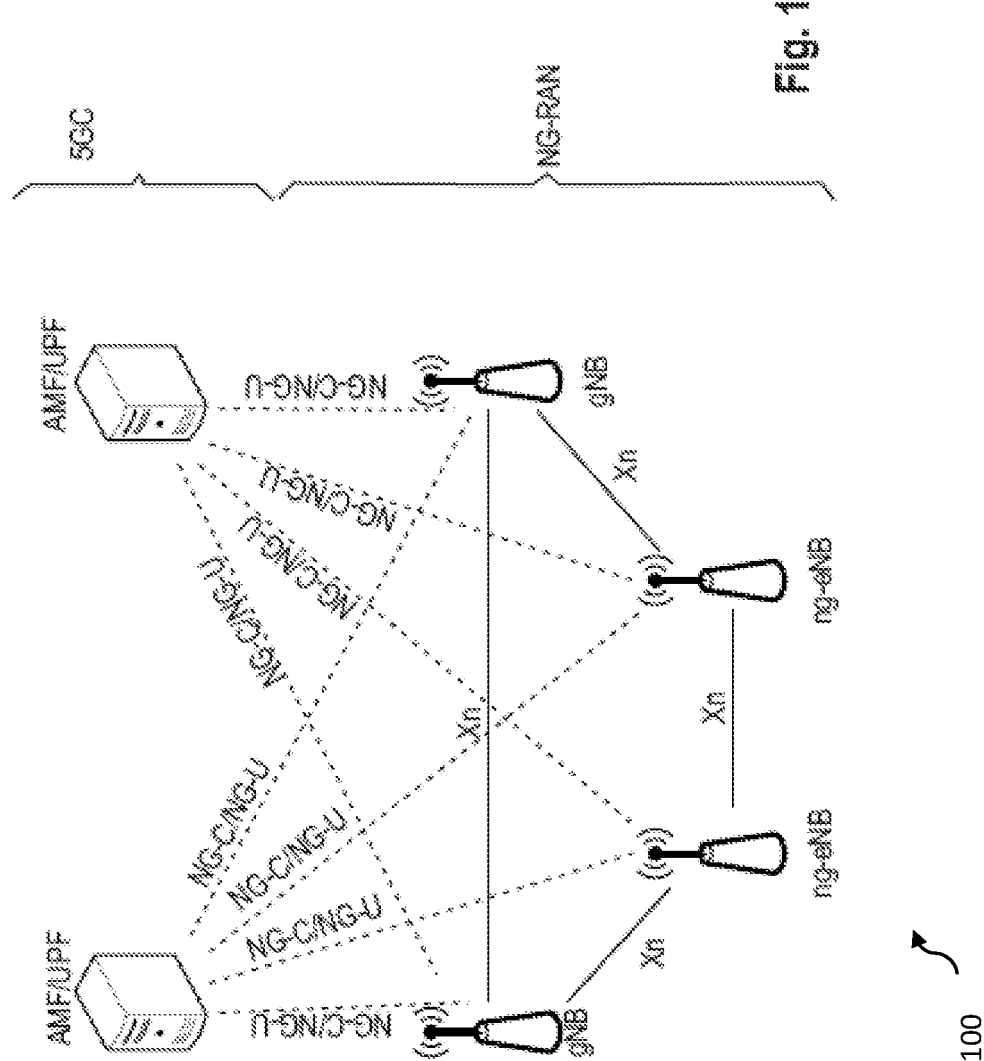
FIG. 1 shows an exemplary 3GPP NR-RAN architecture.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Figure 2:
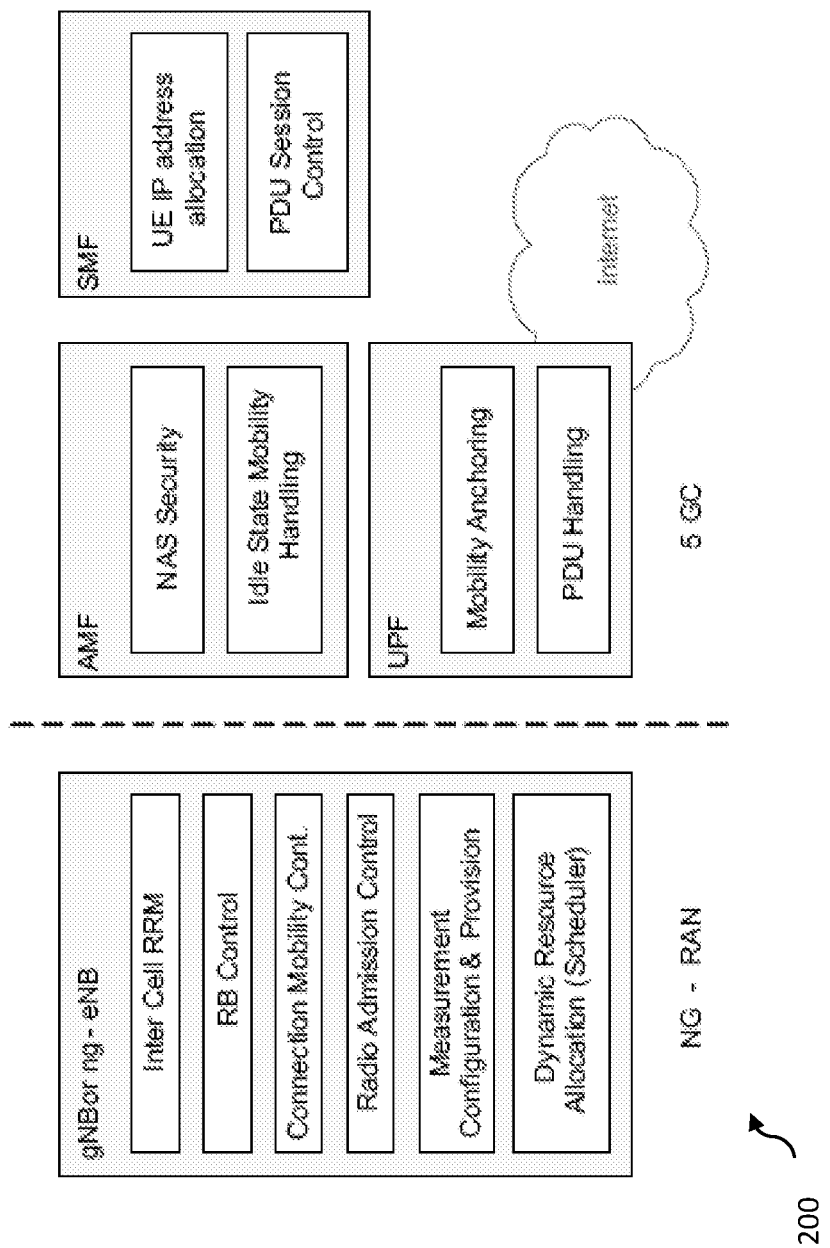
FIG. 2 depicts a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:
Functions for Radio Resource Management such as Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) hosts the following main functions:
Non-Access Stratum, NAS, signaling termination;
NAS signaling security;
Access Stratum, AS, Security control;
Inter Core Network, CN, node signaling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS;
Downlink Data Notification.

Figure 3:
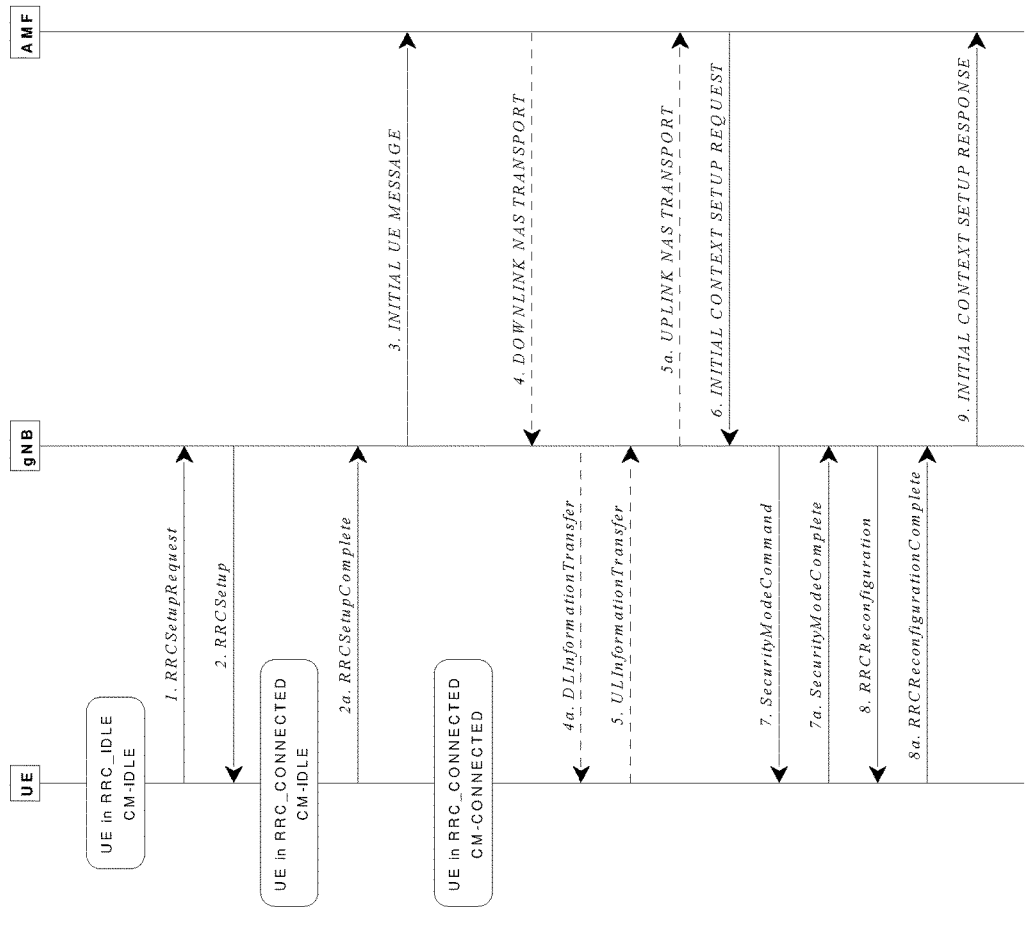
FIG. 3 depicts a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.7.0).

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

Figure 4:
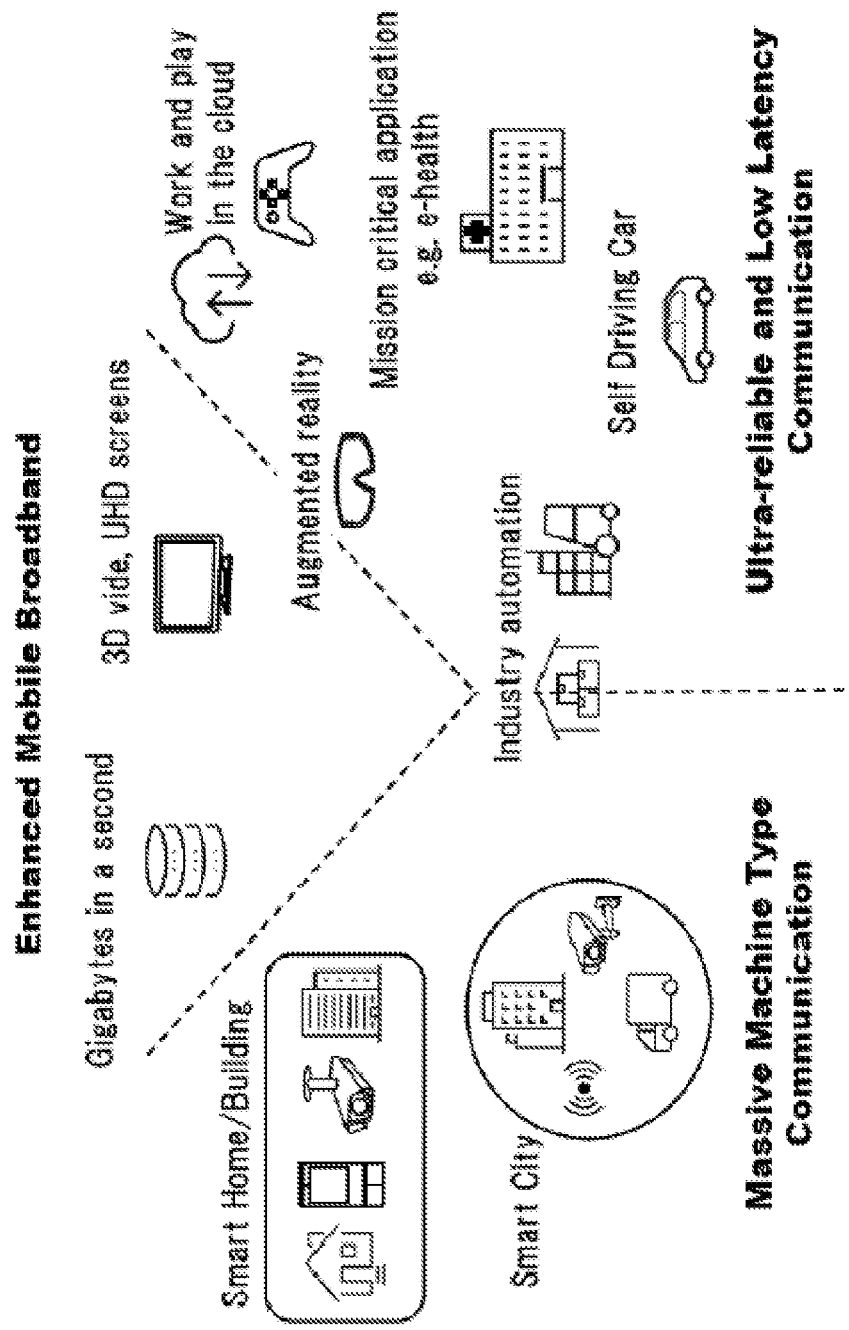
FIG. 4 depicts a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
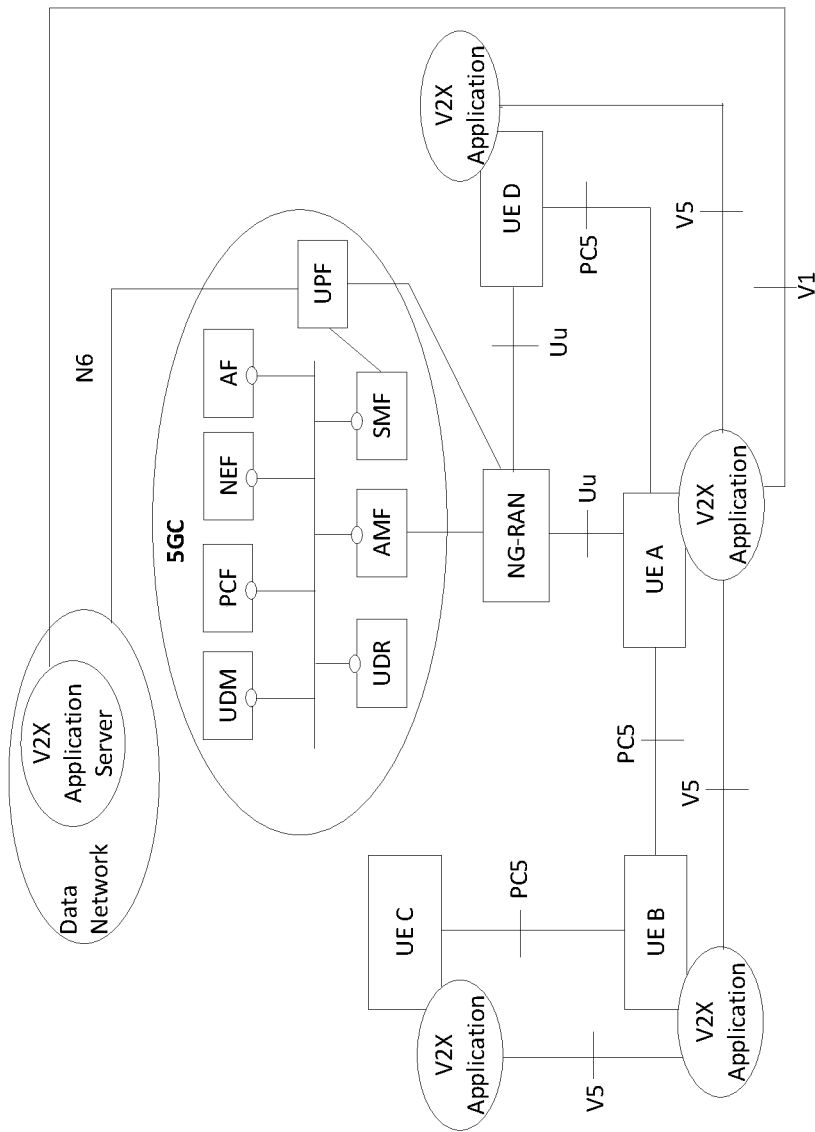
FIG. 5 shows a block diagram showing an exemplary 5G system architecture for V2X communication in a non-roaming scenario.

FIG. 5 illustrates a 5G NR non-roaming reference architecture (see TS 23.287 v16.0.0, section 4.2.1.1). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture for V2X communication, namely, Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF) in the 5GC, as well as with V2X Application Server (V2AS) and Data Network (DN), e.g. operator services, Internet access or 3rd party services. All of or a part of the core network functions and the application services may be deployed and running on cloud computing environments.

As mentioned above, usage of HARQ feedback for release of unused resource(s) is supported at least from a transmitting UE's perspective of a concerned TB. However, no additional signaling is defined for the purpose of release of unused resources by the transmitting UE.

PHY layer sensing and reporting of resources in LTE V2X are defined in the TS36.213 section 14.1.1.6 as per the following steps:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1$≤4 and $T_{2min}$($prio_{TX}$)≤$T_2$≤100, if $T_{2min}$($prio_{TX}$) is provided by higher layers for $prio_{TX}$, otherwise 20≤$T_2$≤100. UE selection of $T_2$ shall fulfil the latency requirement. The total number of the candidate single-subframe resources is denoted by $M_{total}$.

2) The UE shall monitor subframes $t_{n'-10\times P_{step}}^{SL}$, $t_{n'-10\times P_{step}+1}^{SL}, \ldots, t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j\times P_{rsvp\_TX}'=z+P_{step}\times k\times q$ where $j=0, 1, \ldots, C_{resel}-1$, $P_{rsvp\_TX}'=P_{step}\times P_{rsvp\_TX}/100$, k is any value allowed by the higher layer parameter restrictResourceReservationPeriod and q=1, 2, . . . , Q. Here, $$Q = \frac{1}{k}$$

if k<1 and $n-z \leq P_{step}\times k$, where $t_n^{SL}=n$ if subframe n belongs to the set $t_0^{SL}, t_1^{SL}, \ldots, t_{T_{max}}^{SL}$, otherwise subframe $t_n^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.
   PSSCH-RSRP measurement according to the received SCI format 1 is higher than $Th_{prio_{TX},prio_{RX}}$.
   the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+j\times P_{rsvp\_TX}'}$ for q=1, 2, . . . , Q and j=0, 1, . . . , $C_{resel}-1$. Here, $$Q = \frac{1}{P_{rsvp\_RX}}$$

if $P_{rsvp\_RX}<1$ and $n'-m \leq P_{step}\times P_{rsvp\_RX}$, where $t_n^{SL}=n$ if subframe n belongs to the set $(t_0^{SL}, t_1^{SL}, \ldots, t_{T_{max}}^{SL})$, otherwise subframe $t_n^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource R remaining in the set $S_A$, the metric $E_{x,y}$ is defined as the linear average of S-RSSI measured in sub-channels x+k for k=0, . . . , $L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall then report set $S_B$ to higher layers.

Figure 6:
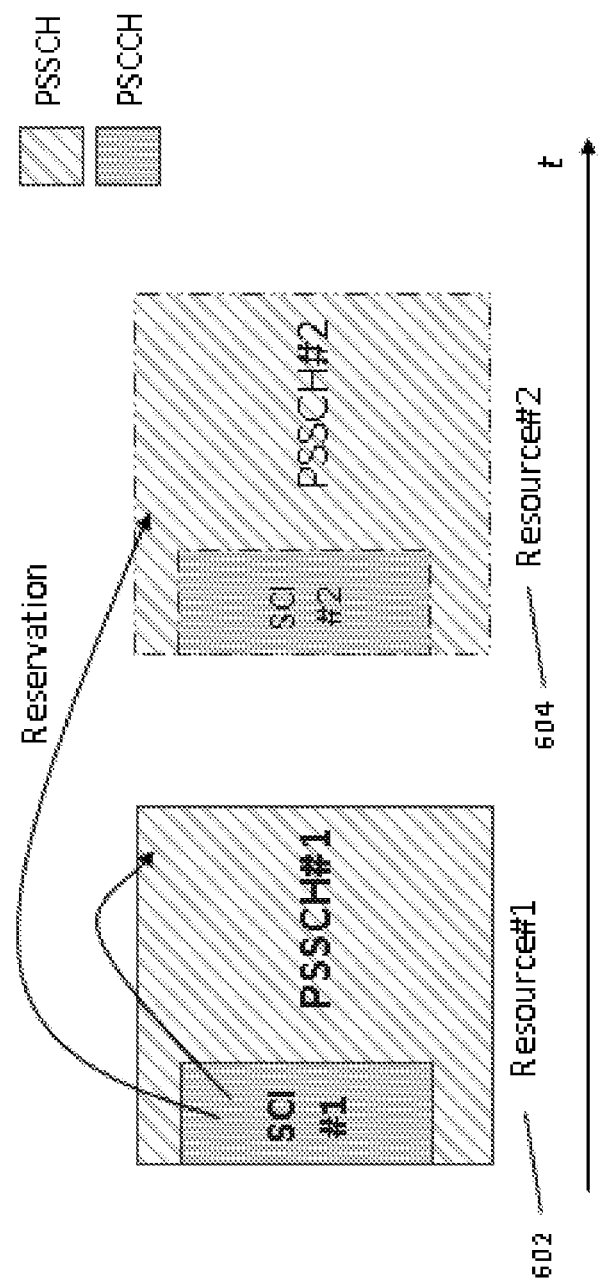
FIG. 6 depicts a schematic diagram 600 illustrating how a resource may be reserved for a future transmission in V2X communications.

FIG. 6 depicts a schematic diagram 600 illustrating how a resource may be reserved for a future transmission in V2X communications. For example, a transmitting UE (Tx UE) may perform a SL transmission of a TB using a resource #1 602 to receiving UE(s) (Rx UE(s)).

The Tx UE and Rx UE(s) may include, for example, communication modules integrated or installed in vehicles subscribed to communication services of one or more telecommunications/Public Land Mobile Network (PLMN) operators. The Tx UE and Rx UE(s) may be subscribed to a telecommunication/PLMN operator operator and communicates with a base station of the telecommunication operator. The base station may be a next generation NodeB (gNB). It can be appreciated by those skilled in the art that the base station 602 can also be a ng-eNB, and may be connected via the NG interface to a 5G core network.

The SL transmission of the TB may be via a Physical Sidelink Shared Channel (PSSCH) and its corresponding control information SCI may be transmitted via a Physical Sidelink Control Channel (PSCCH). Accordingly, as shown in FIG. 6, a SCI #1 in resource #1 602 indicates a current transmission (SCI #1+PSSCH #1) in resource #1 602, and also reserves a resource #2 604 for possible future transmission (SCI #2+PSSCH #2) for the same target receiver(s) i.e. the Rx UE(s). In response to the transmission, response information may be received at a receiver of the Tx UE. The response information relates to the reserved resource #1 and reserved resource #2. The response information may indicate if the transmission of data in the resource #1 is successfully received by the receiving communication apparatus. Also, the response information may also indicate if the reserved resource #4 is reserved for the Rx UE. More detail will be provided below.

Under certain circumstances, the Tx UE (or UE #1) may cancel its future transmission of SCI #2+PSSCH #2, and the reserved resource #2 604 will then be treated as released or "reserved but unused". For example, when PSSCH #2 is a possible HARQ retransmission of PSSCH #1, the resource #2 604 can be released if PSSCH #1 is received successfully.

Thus far, 3GPP has only discussed the possibility of Tx UE to use the "reserved but unused" resource. However, it is still not clear how to utilize the "reserved but unused"

resource (i.e., the behavior of the Rx UE(s), the Tx UE and other UEs of the current transmission) based on the response information.

Therefore, the present invention proposes an improved communication procedure such that the "reserved but unused" resource or resource #2 604 shown in FIG. 6 may be utilized by the Rx UE(s), Tx UE and other UEs.

In the following paragraphs, certain exemplifying embodiments are explained with reference to a V2X communications mechanism that advantageously allows a "reserved but unused" or released resource to be utilised by Rx UE(s), Tx UE and other UEs of a current transmission.

For a sidelink resource reserved by a UE for a future transmission (i.e. after a current transmission has occurred), when the reserved resource is released by the UE, the response information/signalling is made known to a Tx UE. The reserved but unused resource may then be included during resource selection by the UE(s) which are aware of the response information, for possible transmission from the UE(s). As the reservation is known to all UEs which receives/decodes the control information in the current transmission or the response information by the Rx UE.

Referring back to FIG. 6, a Tx UE may perform a sidelink transmission of TB #1 (or data) in resource #1 602. The SCI #1 in resource #1 602 indicates the current transmission (SCI #1+PSSCH #1) in resource #1 602, and may also reserve resource #2 604, which may be used as a future transmission such as, for example, a future HARQ retransmission, for the same target receiver as PSSCH #1. In response to the current transmission of data in resource #1 602, response information is received at Tx UE indicating if the current transmission of data to the target receiver is successfully received. The transmission of TB #1 in resource #1 602 can be a unicast to another UE, or groupcast to a group of UEs, or a broadcast. For all UEs (not only the target receiver of PSSCH #1) to receive SCI #1 where the reference signal received power (RSRP) of SCI #1 is higher than $Th_{a,b}$, the future transmission in resource #2 is reserved. The Tx UE is aware that the resource #2 604 can be released when the transmission of TB #1 in resource #1 602 is successfully received by the receiver UEs, for example by receiving a response information through a Physical Sidelink Feedback Channel (PSFCH) from the receiver UEs. The response information may be any explicit or implicit signal for informing that the reserved resource can be released, such as an acknowledgement feedback (for example, HARQ-ACK or non-NACK) from the receiver UEs to the Tx UE. That is, it is possible of the Tx UE and other UEs to obtain information relating to the resource #1 602 and resource #2 604 by monitoring the PSFCH from the receiver UE (or response information). The Tx UE may also determine and transmit release information to other UEs to inform that the resource #2 604 is released, so that these UEs can include the resource #2 604 in their resource selection for their own transmissions. In various embodiments, the release information may be generated from an associated base station or gNB to the Tx UE and Rx UE(s), for example in the case of Mode-1 transmissions.

Figure 7:
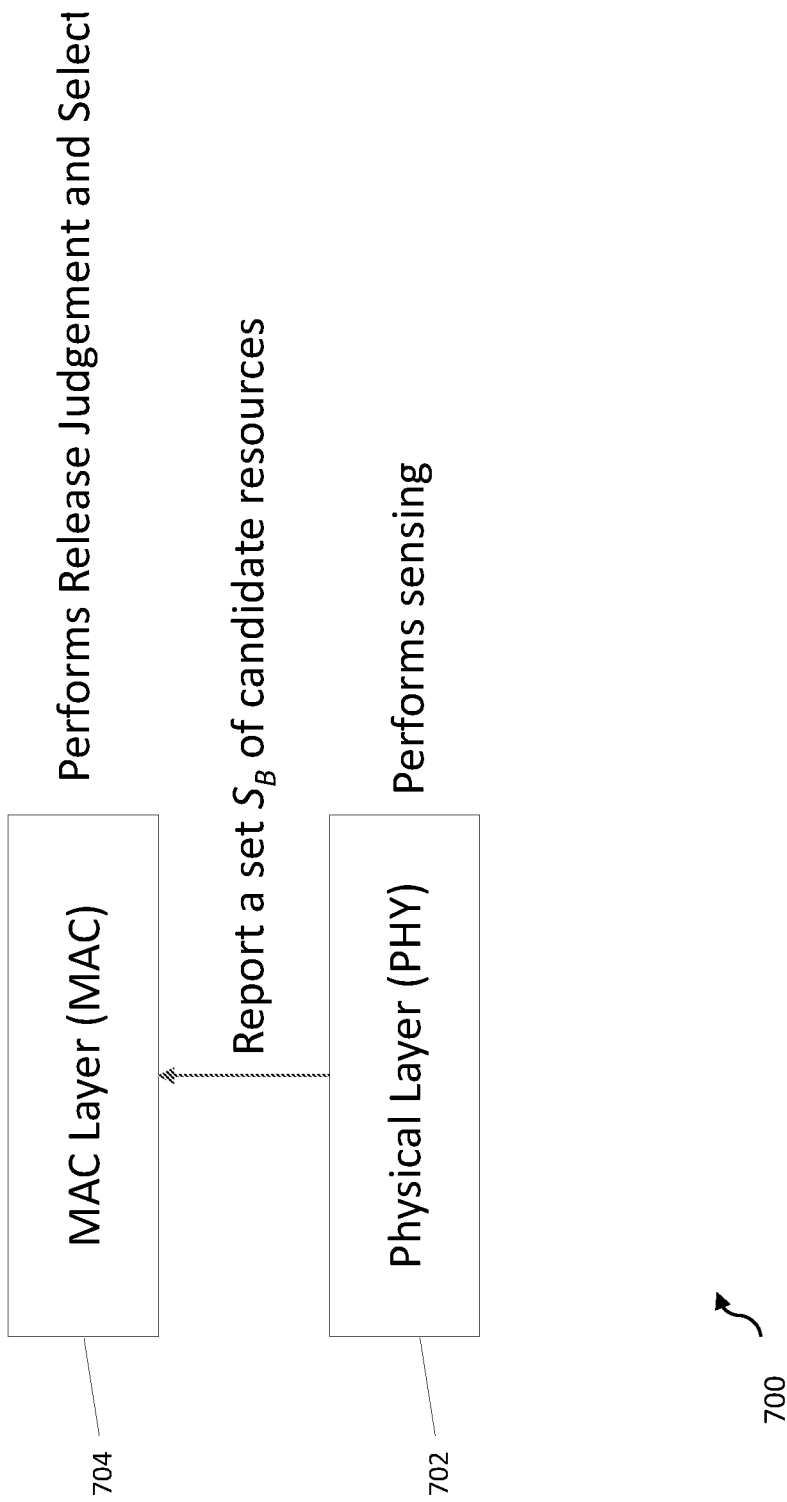
FIG. 7 depicts a schematic diagram 700 illustrating how a reserved resource may be utilised according to various embodiments.

FIG. 7 depicts a schematic diagram 700 illustrating how a released resource may be utilised according to various embodiments, after a UE is aware of release information relating to a reserved resource, the reserved resource being one which may be reserved for a transmission. For example, the Tx UE as described in FIG. 6 may reuse the released resource #2 604 for a subsequent transmission of another TB, for example a TB #2. Under this embodiment, the PHY layer 702 of Tx UE performs sensing procedures for candidate resources from an initial set $S_A$ and then reports a set of candidate resources $S_B$ to the MAC layer 704 of the Tx UE. The initial set of $S_A$ contains all $M_{total}$ candidate resources for subsequent transmission of TB #2. The PHY layer 702 may perform, during the sensing procedures, a step of resource exclusion such that the reserved resource #2 604 will not be excluded from the initial set $S_A$ if the reserved resource #2 604 is within $S_A$. Conversely, the reserved resource #2 604 will be excluded from the initial set $S_A$ if the reserved resource #2 604 is not within $S_A$. The set $S_B$ that is reported to the MAC layer 704 contains $\geq 20\% * M_{total}$ candidate resources with the lowest RSRP from the remaining set $S_A$ after the resource exclusion step.

Thereafter, the MAC layer 704 performs release judgement and resource selection. Release judgement is performed on reserved candidate resources, wherein the MAC layer 704 judges whether or not a reserved candidate resource is released based on release information of the reserved candidate resource. The release information may be determined or generated by the Tx UE (i.e. for a candidate resource that is reserved for a future transmission from the TX UE, such as resource #2 604), or received from the Rx UE(s) or an associated base station. For example, if $S_B$ contains resource #2 604, and the resource #2 604 is judged as released by MAC layer:

The contiguous candidate resource containing resource #2 604 (if there is sufficient size and latency) may be prioritized by the MAC layer 704 during the resource selection for subsequent transmission of TB #2

The resource #2 604 may be partially used, solely used, or used conjugately with other contiguous resources Otherwise, the MAC layer 704 may perform a random selection of a resource from $S_B$ for the transmission of TB #2.

Figure 8:
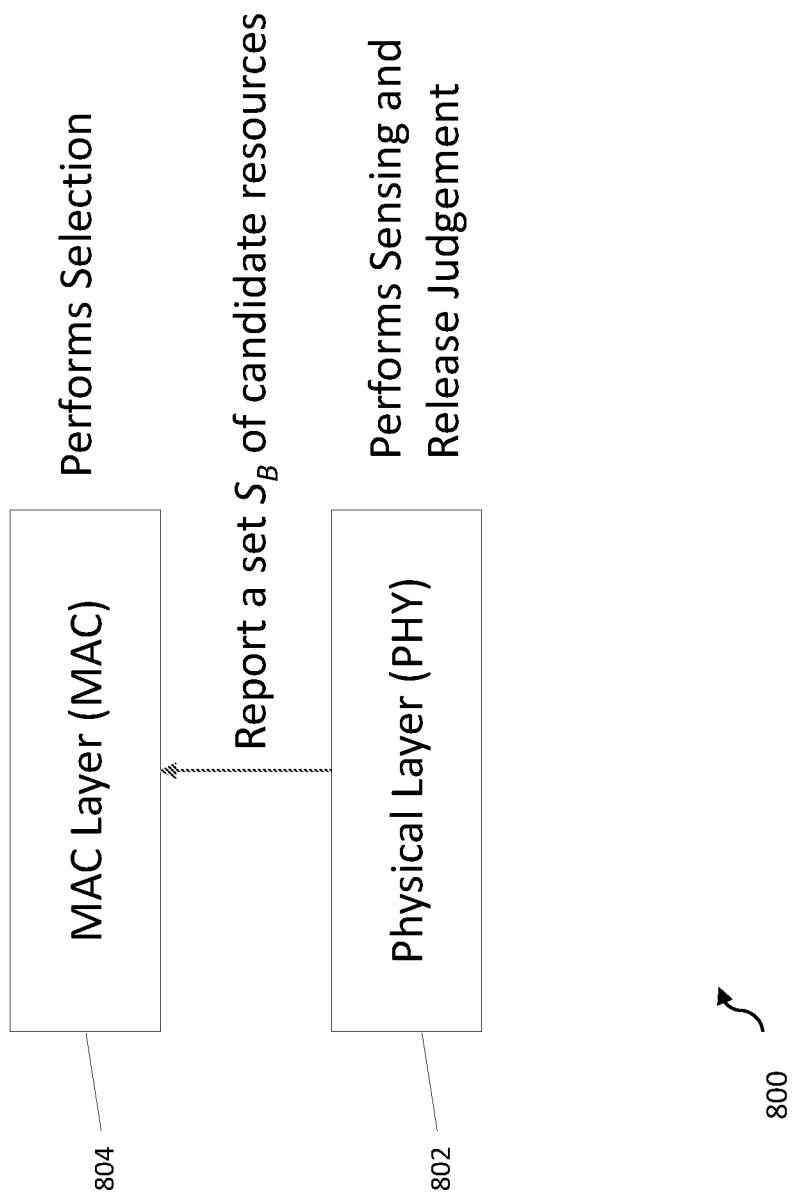
FIG. 8 depicts a schematic diagram 800 illustrating how a reserved resource may be utilised according to various embodiments.

FIG. 8 depicts a schematic diagram 800 illustrating how a released resource may be utilised according to various embodiments. For example, the Tx UE as described in FIG. 6 may reuse the released resource #2 604 for a subsequent transmission of another TB, for example a TB #2. Under an embodiment, the PHY layer 802 of Tx UE performs sensing procedures and release judgement for candidate resources from an initial set $S_A$ and then reports a set of candidate resources $S_B$ to the MAC layer 804 of the Tx UE. The initial set of $S_A$ contains all $M_{total}$ candidate resources for subsequent transmission of TB #2. The PHY layer 802 may perform, during the sensing procedures, a step of resource exclusion such that the reserved resource #2 604 will not be excluded from the initial set $S_A$ if the reserved resource #2 604 is within $S_A$ and if the reserved resource #2 604 is judged as released by the PHY layer 802. Conversely, the reserved resource #2 604 will be excluded from the initial set $S_A$ even if the reserved resource #2 604 is within $S_A$, but the reserved resource #2 604 is judged as non-released by the PHY layer 802. Release judgement is performed on reserved candidate resources, wherein the PHY layer 802 judges a reserved candidate resource as released based on release information of the reserved candidate resource. The release information may be determined by the Tx UE (i.e. for a candidate resource that is reserved for a future transmission from the TX UE, such as resource #2 604), or received from the Rx UE(s) or an associated base station. The set $S_B$ that is reported to the MAC layer 804 contains $\geq 20\% * M_{total}$ candidate resources with the lowest RSRP from the remaining set $S_A$ after the resource exclusion step.

Thereafter, the MAC layer 804 performs resource selection. For example, If $S_B$ contains resource #2 604:

The contiguous candidate resource containing resource #2 604 (if there is sufficient size and latency) may be prioritized by MAC layer 804 during the resource selection for subsequent transmission of TB #2

The resource #2 604 may be partially used, solely used, or used conjugately with other contiguous resources Otherwise, the MAC layer 804 may perform a random selection of a resource from $S_B$ for the transmission of TB #2.

That is, a reserved resource may be utilised according to various embodiments, after a UE is aware of response information relating to a reserved resource. For example, the Tx UE as described in FIG. 6 may reuse the released resource #2 604 for a subsequent transmission of another TB, for example a TB #2. In an example, the set of candidate resources $S_B$ may be provided to the MAC layer of the Tx UE by pre-configuration, RRC or MAC. Thereafter, the MAC layer performs resource selection. For example, If $S_B$ contains resource #2 604:

The contiguous candidate resource containing resource #2 604 (if there is sufficient size and latency) may be prioritized by MAC layer during the resource selection for subsequent transmission of TB #2

The resource #2 604 may be partially used, solely used, or used conjugately with other contiguous resources Otherwise, the MAC layer may perform a random selection of a resource from $S_B$ for the transmission of TB #2.

Figure 9:
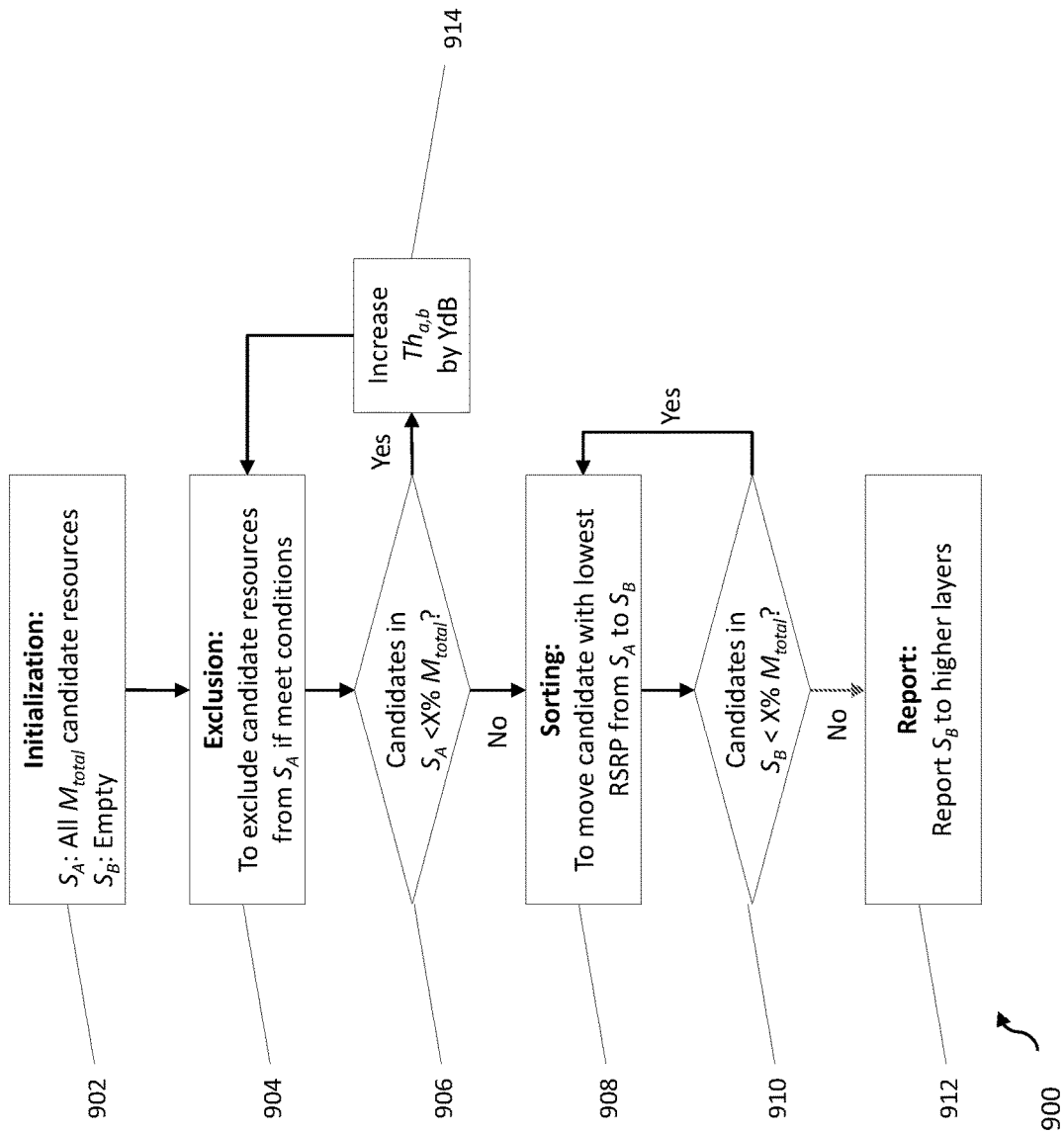
FIG. 9 shows a flow diagram 900 illustrating how a physical (PHY) layer performs sensing for methods shown in FIGS. 7 and 8 according to various embodiments.

FIG. 9 shows a flow diagram 900 illustrating how a PHY layer, such as the PHY layer 702 and 802, performs sensing in the methods shown in FIG. 7 and FIG. 8 respectively according to various embodiments. At step 902, the PHY layer senses a set $S_A$ with all $M_{total}$ candidate resources. At step 904, the PHY layer performs an iteration of resource exclusion such that candidate resources are excluded from set $S_A$ if certain conditions are met. The conditions for exclusion differ for the methods shown in FIG. 7 and FIG. 8, since the PHY layer performs release judgement in the method shown in FIG. 8 but does not do so in the method shown in FIG. 7. At step 906, it is determined whether the number of candidate resources remaining in $S_A$ after the resource exclusion step 904 is <0.2 $M_{total}$. If it is determined that the number of candidate resources remaining in $S_A$ after the resource exclusion step 904 is <0.2 $M_{total}$, the process proceeds to step 914 where the $Th_{a,b}$ is increased by 3 dB, and then proceeds back to step 904 for a repeated procedure of the resource exclusion process, until it is determined at step 906 that the set $S_A$ contains ≥20%*$M_{total}$ candidate resources.

Thereafter, the process proceeds to a sorting step 908 where candidate resources with lowest RSRP are moved from $S_A$ to $S_B$. In various embodiments, for step 908 under the method shown in FIG. 8, the resource #2 604 may be given more weightage to be included in the set $S_B$, when the resource #2 604 is excluded from $S_A$, and satisfy the amount of lowest RSPR of 20% of $M_{total}$. In various embodiments, for step 908 under the methods shown in FIG. 7 and FIG. 8, the resource #2 604 may be given more weightage to be included in the set $S_B$, when the resource #2 604 is not excluded from $S_A$, but not satisfy the amount of lowest RSPR of 20% of $M_{total}$.

At step 910, it is determined whether the number of candidate resources in set $S_B$<0.2 $M_{total}$. If it is determined that the number of candidate resources in set $S_B$ is <0.2 $M_{total}$, the process repeats sorting step 908 until the number of candidate resources in set $S_B$ is ≥0.2 $M_{total}$. At step 912, the set $S_B$ is reported to the higher layers, for example the MAC layer 704 or MAC layer 804.

In an embodiment, a transmitter of a Tx UE transmits to a receiving communication apparatus data in a first reserved resource among at least two reserved resources, each of the at least two reserved resources being reserved for a transmission to the receiving communication apparatus and in response, receives, at a receiver, response information indicating if the transmission of data in the first reserved resource is successfully received by the receiving communication apparatus. Circuitry of the communication apparatus then determines a usage of the second reserved resource among the at least two reserved resources based on the response information.

Figure 10:
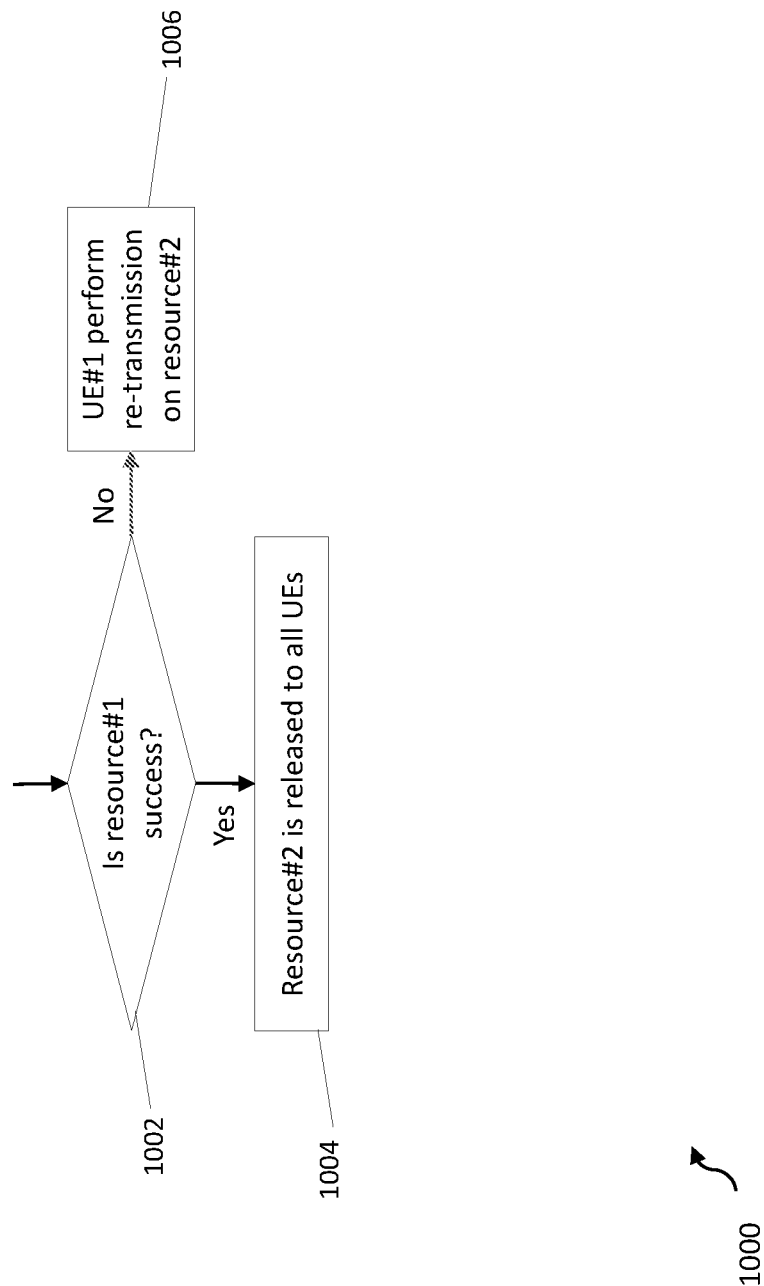
FIG. 10 shows a flow diagram 6000 illustrating how a usage of a reserved but not used resource is determined in Operation A according to various embodiments.

FIG. 10 shows a flow diagram 6000 illustrating how a usage of a reserved but not used resource (or resource #2 604 shown in FIG. 6) is determined in Operation A according to various embodiments. At step 6002, the Tx UE (or transmitting communication apparatus or UE #1) determines if transmission of data in the first reserved resource is successfully received by the receiving communication apparatus (or Rx UE or UE #2) based on response information received at the Tx UE. In the event that it is determined that transmission of data in the first reserved resource is not successfully received by the receiving communication apparatus, the process proceeds to step 6006 wherein the Tx UE performs a re-transmission of data in the second reserved resource (or resource #2). In the event that it is determined that transmission of data in the first reserved resource is successfully received by the receiving communication apparatus, the process proceeds to step 6004 and the second reserved resource (or reserved but not used resource) may be released to all communication apparatuses on the network. In an embodiment, the second reserved resource (or reserved but not used resource) may be released to communication apparatuses having equal priorities on the network. Alternatively, the second reserved resource (or reserved but not used resource) may be released to communication apparatuses having equal or higher priorities on the network. That is, the second reserved resource may be released to at least one of the receiving communication apparatus, the communication apparatus and another communication apparatus when the response information indicates that the data in the first reserved resource is successfully received by the receiving communication apparatus. For example, during sensing or (re-) evaluation procedure, the resource #2 will not excluded as a resource that is reserved to the communication apparatuses on the network. In this manner, it is possible for other communication apparatuses to be made aware that resource #2 is released.

For example, when the PHY layer 702 determines whether a candidate resource is reserved, it will not determine that the second reserved resource as reserved, wherein the second reserved resource is not excluded from set $S_A$.

However, it is not mandatory for other UEs to use the second reserved resource and hence, not necessary for the other UEs to monitor response information.

Figure 11:
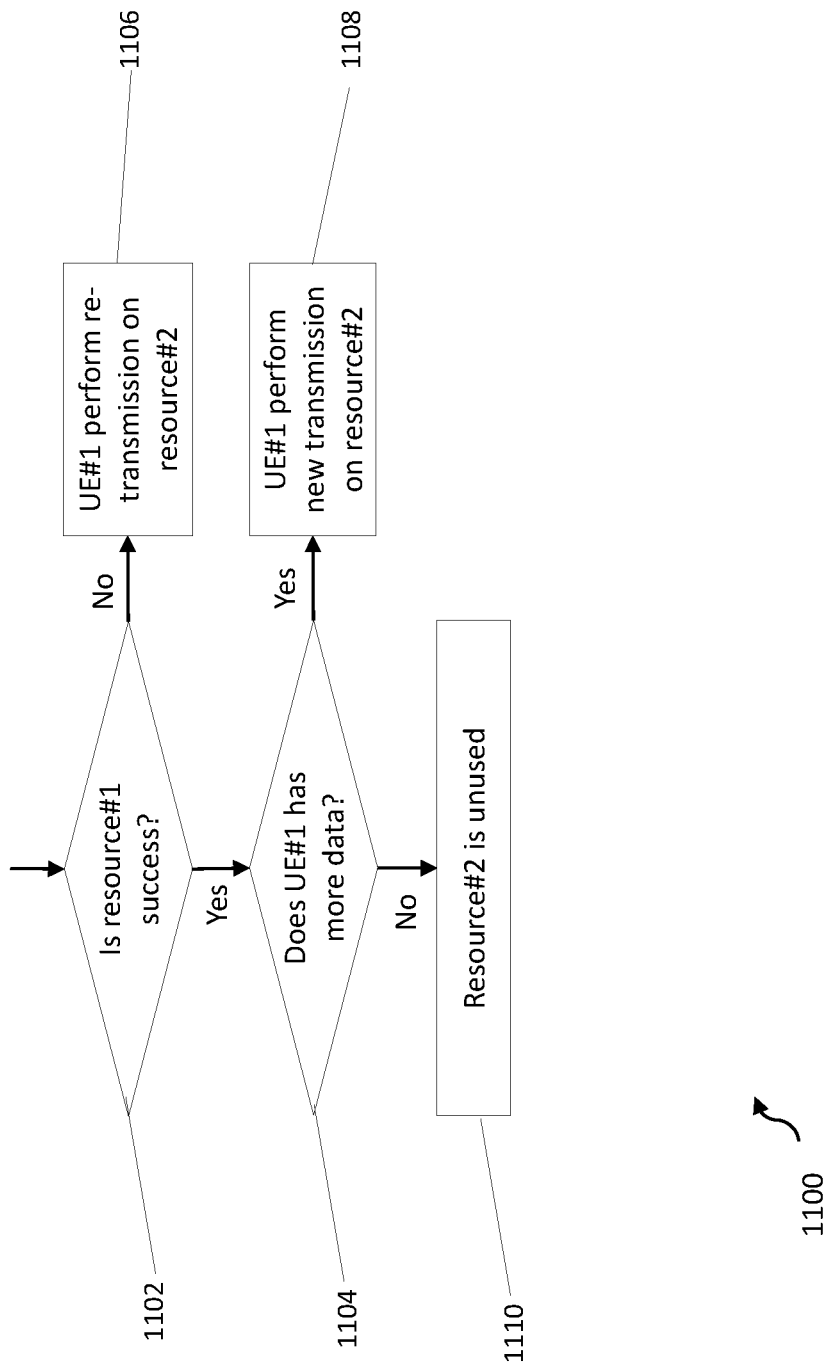
FIG. 11 shows a flow diagram 1100 illustrating how a usage of a reserved but not used resource may be determined in Operation B according to various embodiments.

FIG. 11 shows a flow diagram 1100 illustrating how a usage of a reserved but not used resource may be determined in Operation B according to various embodiments. At step 1102, the Tx UE (or transmitting communication apparatus or UE #1) determines if transmission of data in the first reserved resource (or resource #1) is successfully received by the receiving communication apparatus (or Rx UE) based on response information received at the Tx UE. In the event that it is determined that transmission of data in the first reserved resource is not successfully received by the receiving communication apparatus, the process proceeds to step 1106 wherein the Tx UE performs a re-transmission of data in the second reserved resource (or resource #2). In the event that it is determined that transmission of data in the first reserved resource is successfully received by the receiving communication apparatus, the process proceeds to step 1104, wherein it is determined if there is available data on Tx UE for transmission. If it is determined that there is available data on Tx UE for transmission, the process proceeds to step 1108, wherein the Tx UE performs a transmission of data on resource #2 604. If it is determined that there is no available data on Tx UE for transmission, the process proceeds to step 1110, wherein the resource #2 is not used. In Operation B, Tx UE always keeps the reservation right on resource #2 when it is determined that the transmission of data on resource #1 is successfully received.

Figure 12:
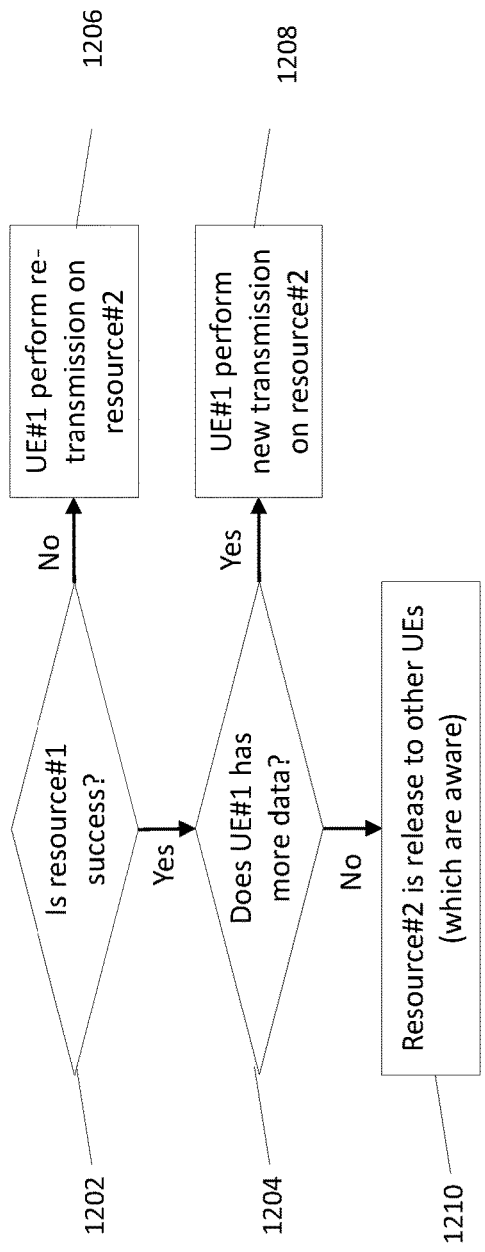
FIG. 12 shows a flow diagram 1200 illustrating how a usage of a reserved but not used resource may be determined in Operation C according to various embodiments.

FIG. 12 shows a flow diagram 1200 illustrating how a usage of a reserved but not used resource may be determined in Operation C according to various embodiments. At step 1202, the Tx UE (or transmitting communication apparatus or UE #1) determines if transmission of data in the first reserved resource (or resource #1) is successfully received by the receiving communication apparatus (or Rx UE or UE #2) based on response information received at the Tx UE. In the event that it is determined that transmission of data in the first reserved resource is not successfully received by the receiving communication apparatus, the process proceeds to step 1206 wherein the Tx UE performs a re-transmission of data in the second reserved resource. In the event that it is determined that transmission of data in the first reserved resource is successfully received by the receiving communication apparatus (or Rx UE), the process proceeds to step 1204, wherein it is determined if there is available data on Tx UE for transmission. If it is determined that there is available data on Tx UE for transmission, the process proceeds to step 1208, wherein the Tx UE performs a transmission of data on resource #2 604. If it is determined that there is no available data on Tx UE for transmission, the process proceeds to step 1210, wherein the resource #2 may be used by other UEs including the Rx UE. Further, during sensing or (re-) evaluation procedure, the resource #2 will not excluded as a resource that is reserved to the communication apparatuses on the network. In this manner, it is possible for other communication apparatuses to be made aware that resource #2 is released.

Figure 13:
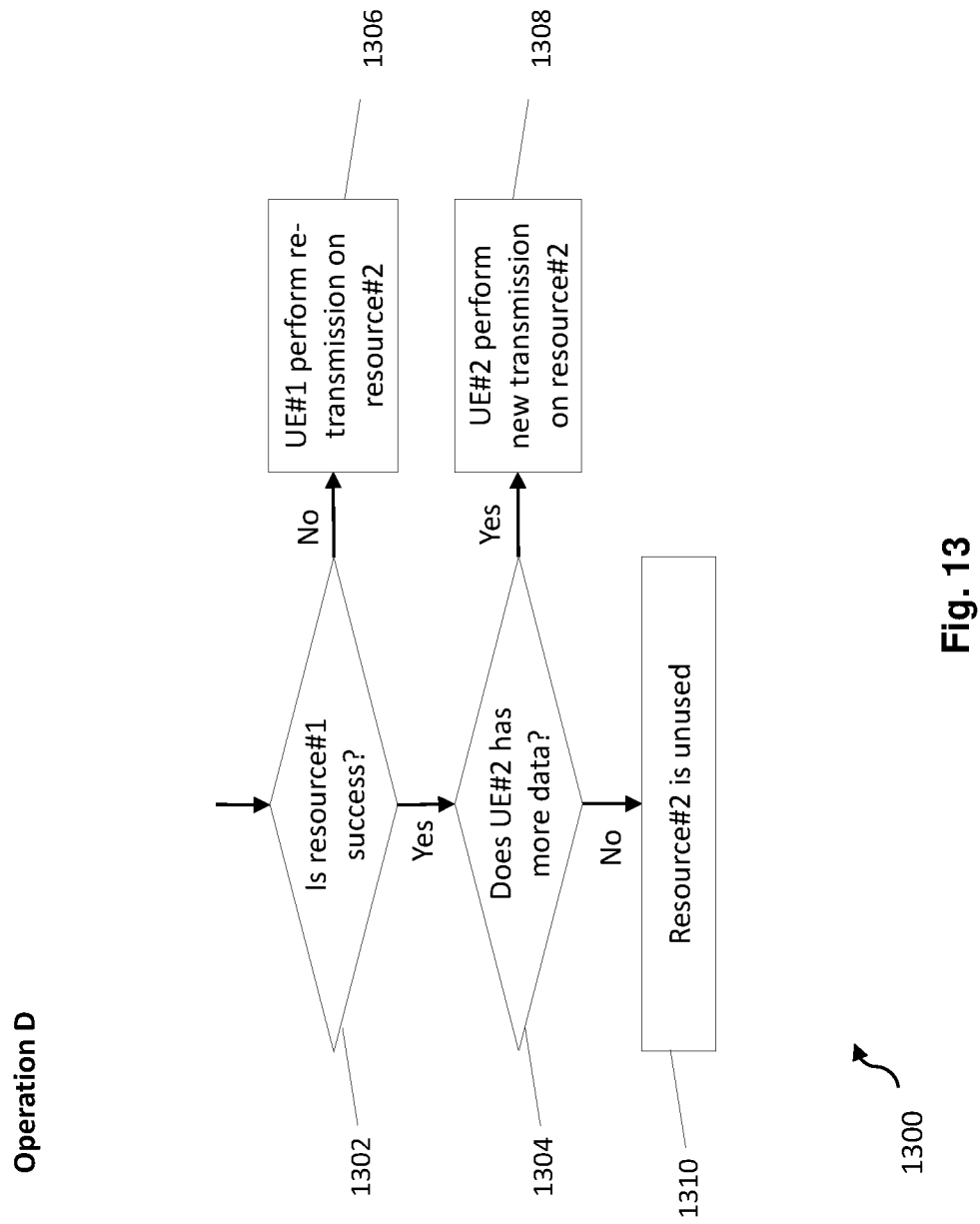
FIG. 13 shows a flow diagram 1300 illustrating how a usage of a reserved but not used resource may be determined in Operation D according to various embodiments.

FIG. 13 shows a flow diagram 1300 illustrating how a usage of a reserved but not used resource may be determined in Operation D according to various embodiments. At step 1302, the Tx UE (or transmitting communication apparatus or UE #1) determines if transmission of data in the first reserved resource is successfully received by the receiving communication apparatus (or Rx UE or UE #2) based on response information received at the Tx UE. In the event that it is determined that transmission of data in the first reserved resource is not successfully received by the receiving communication apparatus, the process proceeds to step 1306 wherein the Tx UE performs a re-transmission of data in the second reserved resource (or resource #2). In the event that it is determined that transmission of data in the first reserved resource is successfully received by the receiving communication apparatus (or Rx UE), the process proceeds to step 1304, wherein it is determined if there is available data on Rx UE for transmission. In the event that it is determined if there is available data on Rx UE for transmission, the process proceeds to step 1308 wherein the Rx UE performs a transmission of data in the second reserved resource (or resource #2). This may be indicated in the response information to inform the Tx UE that the resource #2 is reserved for the receiving communication apparatus.

In the event that it is determined if there is no available data on Rx UE for transmission, the process proceeds to step 1310 wherein the resource #2 is unused. This may be indicated in the response information to inform the Tx UE that the resource #2 is unused when it is determined that there is no available data on Rx UE for transmission.

Figure 14:
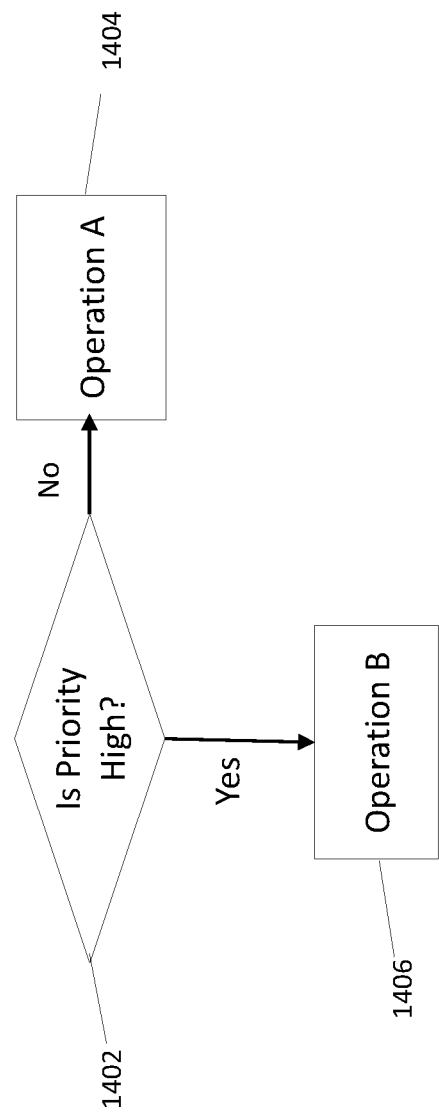
FIG. 14 shows a flow diagram 1400 illustrating how a usage of a reserved but unused resource may be determined based on priority according to various embodiments.

FIG. 14 shows a flow diagram 1400 illustrating how a usage of a reserved but unused resource may be determined based on priority according to various embodiments. The UEs on the network may be (pre-) configured which operation to be adopted for the reserved but unused resource under different scenarios. For example, different operator/vendors can (pre-) configure different operations on different cells or different geographical areas. Different operations can be (pre-) configured or specified in standards for different transmission priorities (or priority groups) of resource #1. For example, at the step 1402, it is determined if the priority is high. If it is determined that the priority is high, the process proceeds to step 1404, for example when the priority is 4-7, and Operation A shown in FIG. 10 will be carried out. If it is determined that the priority is not high, the process proceeds to step 1406, for example when the priority is 0-3, and Operation B shown in FIG. 11 will be carried out.

Figure 15:
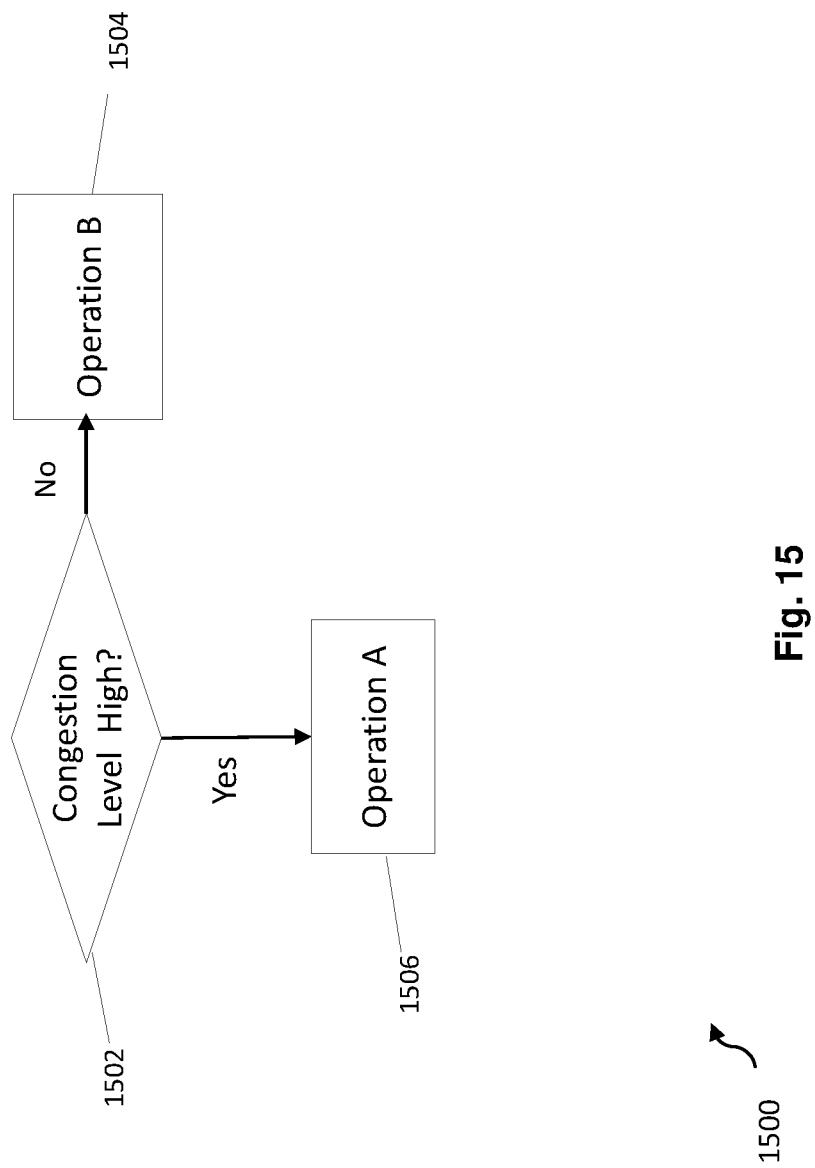
FIG. 15 depicts a schematic diagram 1500 illustrating how a usage of a reserved but unused resource may be determined based on congestion level according to various embodiments.

FIG. 15 depicts a schematic diagram 1500 illustrating how a usage of a reserved but unused resource may be determined based on congestion level according to various embodiments. Different operations can be (pre-) configured or specified in standards for different congestion levels. For example, at the step 1502, it is determined if the congestion level is high. If it is determined that the congestion level is high, the process proceeds to step 1504, and Operation B shown in FIG. 11 will be carried out. If it is determined that the congestion level is not high, the process proceeds to step 1506, for example when the congestion level is high, and Operation A shown in FIG. 10 will be carried out.

Figure 16:
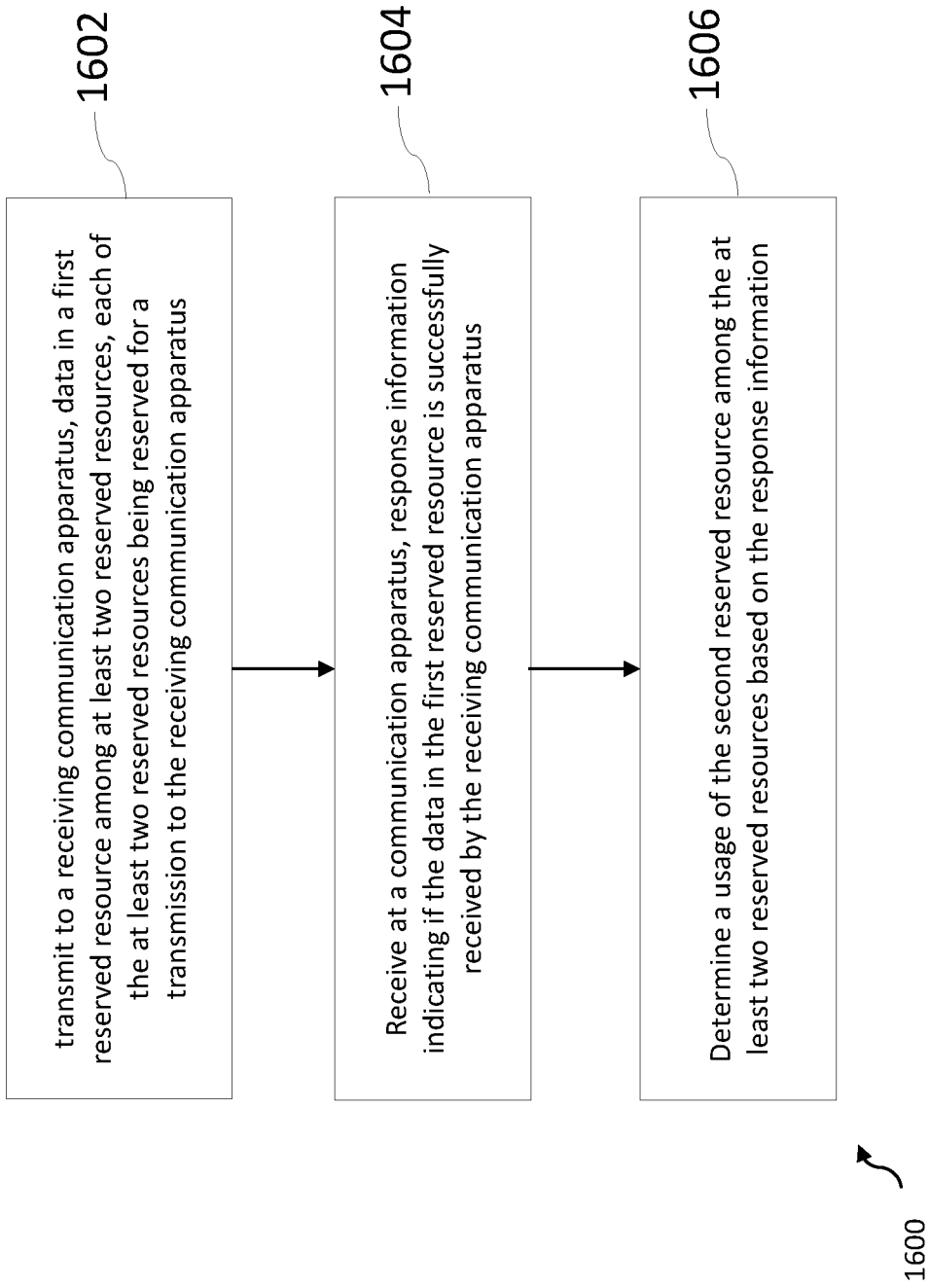
FIG. 16 shows a flow diagram 1600 illustrating a communication method according to various embodiments.

FIG. 16 shows a flow diagram 1600 illustrating a communication method according to various embodiments. In step 1602, the method includes transmitting to a receiving communication apparatus, data in a first reserved resource among at least two reserved resources, each of the at least two reserved resources being reserved for a transmission to the receiving communication apparatus. In step 1604, the method includes receiving at a communication apparatus, response information indicating if the data in the first reserved resource is successfully received by the receiving communication apparatus. In step 1606, the method includes determining a usage of the second reserved resource among the at least two reserved resources based on the response information.

Figure 17:
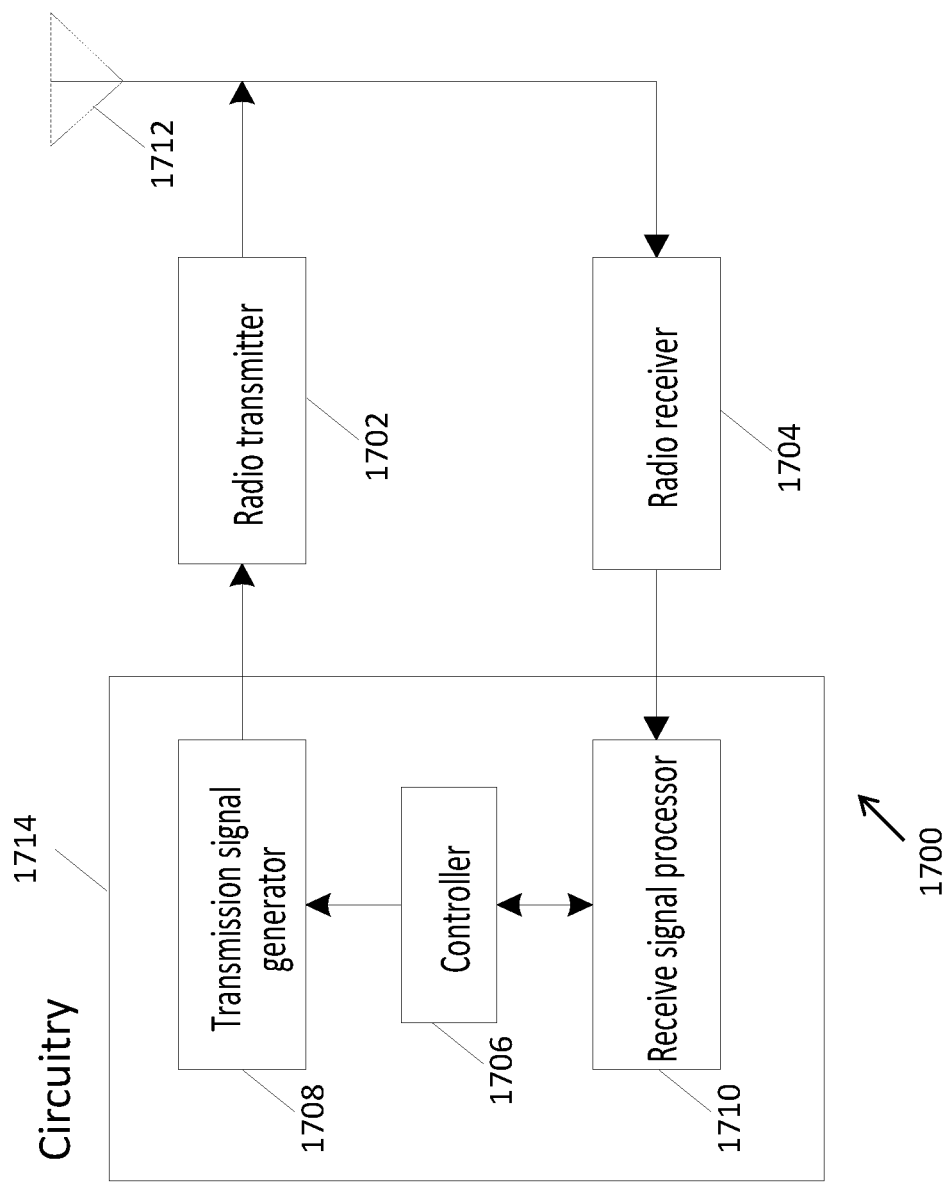
FIG. 17 shows a schematic example of communication apparatus in accordance with various embodiments. The communication apparatus may be implemented as an UE or a gNB/base station and configured for utilising release resources in accordance with various embodiments of the present disclosure.

FIG. 17 shows a schematic, partially sectioned view of the communication apparatus 1700 that can be implemented for establishing the V2X communications in accordance with various embodiments as shown in FIGS. 1 to 16. The communication apparatus 1700 may be implemented as a UE or a base station according to various embodiments.

Various functions and operations of the communication apparatus 1700 are arranged into layers in accordance with a hierarchical model. In the model, lower layers report to higher layers and receive instructions therefrom in accordance with 3GPP specifications. For the sake of simplicity, details of the hierarchical model are not discussed in the present disclosure.

As shown in FIG. 17, the communication apparatus 1700 may include circuitry 1714, at least one radio transmitter 1702, at least one radio receiver 1704, and at least one antenna 1712 (for the sake of simplicity, only one antenna is depicted in FIG. 17 for illustration purposes). The circuitry 1714 may include at least one controller 1706 for use in software and hardware aided execution of tasks that the at least one controller 1706 is designed to perform, including control of communications with one or more other communication apparatuses in a wireless network. The circuitry 1714 may furthermore include at least one transmission signal generator 1708 and at least one receive signal processor 1710. The at least one controller 1706 may control the at least one transmission signal generator 1708 for generating signals (for example, a signal containing release information relating to a reserved resource) to be sent through the at least one radio transmitter 1702 to one or more other communication apparatuses and the at least one receive signal processor 1710 for processing signals (for example, a signal containing response information relating to a reserved resource among at least two reserved resources) received through the at least one radio receiver 1704 from the one or more other communication apparatuses under the control of the at least one controller 1706. The at least one transmission signal generator 1708 and the at least one receive signal processor 1710 may be stand-alone modules of the communication apparatus 1700 that communicate with the at least one controller 1706 for the above-mentioned functions, as shown in FIG. 17. Alternatively, the at least one transmission signal generator 1708 and the at least one receive signal processor 1710 may be included in the at least one controller 1706. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1702, at least one radio receiver 1704, and at least one antenna 1712 may be controlled by the at least one controller 1706.

The communication apparatus 1700, when in operation, provides functions required for utilization of a reserved resource. For example, the communication apparatus 1700 may be a UE, and the radio receiver 1704 may, in operation, receive response information indicating if the data in the first reserved resource is successfully received by the receiving communication apparatus and determine a usage of the second reserved resource among the at least two reserved resources based on the response information.

For example, the communication apparatus 1700 may be a UE, and the circuitry 1714 may, in operation, determine a usage of the second reserved resource among the at least two reserved resources based on the response information The receiver 1704 may, in operation, receive the response information from a base station, an access point (AP) or a communication apparatus different from the another communication apparatus. The response information may be received over a PSFCH. The circuitry 1714 may be further configured to select a resource from a plurality of resource candidates when the communication apparatus is to do a subsequent transmission, wherein the plurality of resource candidates includes the reserved resource, and wherein the transmitter 1702 may be further configured to transmit the subsequent transmission using the selected resource.

The circuitry 1714 may be further configured to exclude or not exclude the reserved resource from the plurality of resource candidates, wherein judgement for excluding or not excluding the reserved resource from the plurality of resource candidates may be done by a PHY layer or a MAC layer based on the release information. The selection of the resource may be done by a MAC layer. The transmitter 1702 may be further configured to transmit the release information to a group of communication apparatuses.

As described above, the embodiments of the present disclosure provide an advanced communication system, communication methods and communication apparatuses for utilization of released resource that advantageously reduces chances of over-the-air collisions on the released resource.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
a transmitter, which, in operation, transmits to a receiving communication apparatus data in a first reserved resource among at least two reserved resources, each of the at least two reserved resources being selected based on a resource selection or re-selection procedure and being reserved for a transmission to the receiving communication apparatus;
a receiver, which, in operation, receives from the receiving communication apparatus a physical sidelink feedback channel (PSFCH) that is used to indicate if the transmission of data in the first reserved resource is successfully received by the receiving communication apparatus; and
circuitry, which, in operation, determines that a second reserved resource among the at least two reserved resources is held by the communication apparatus and is not used by the communication apparatus based on the PSFCH.

2. The communication apparatus according to claim 1, wherein the circuitry, in operation, prior to determining that the second reserved resource is not used, determines if the receiving communication apparatus has available data for transmission.

3. The communication apparatus according to claim 2, wherein the circuitry, in operation determines that the receiving communication apparatus does not have available data for transmission.

4. The communication apparatus according to claim 1, wherein the circuitry, in operation, prior to determining that the second reserved resource is not used, determines if the communication apparatus has available data for transmission.

5. The communication apparatus according to claim 4, wherein the circuitry, in operation determines that the communication apparatus does not have available data for transmission.

6. A communication method comprising:
transmitting, to a receiving communication apparatus, data in a first reserved resource among at least two reserved resources, each of the at least two reserved resources being selected based on a resource selection or re-selection procedure and being reserved for a transmission to the receiving communication apparatus;
receiving, at a communication apparatus, from the receiving communication apparatus a physical sidelink feedback channel (PSFCH) that is used to indicate if the data in the first reserved resource is successfully received by the receiving communication apparatus; and
determining that a second reserved resource among the at least two reserved resources is held by the communication apparatus and is not used by the communication apparatus based on the PSFCH.

7. The communication method according to claim 6, further comprising:
prior to determining that the second reserved resource is not used, determining if the receiving communication apparatus has available data for transmission.

8. The communication method according to claim 7, comprising:
determining that the receiving communication apparatus does not have available data for transmission.

9. The communication method according to claim 6, further comprising:
prior to determining that the second reserved resource is not used, determining if the communication apparatus has available data for transmission.

10. The communication method according to claim 9, comprising:
determining that the communication apparatus does not have available data for transmission.

* * * * *